United States Patent [19]

Stevens

[11] Patent Number: 4,726,601
[45] Date of Patent: Feb. 23, 1988

[54] TELESCOPING BOAT TRAILER WITH SCREW DRIVE AND CAM DETACHABLE SAFETY BRAKE SEPARATOR

[76] Inventor: Daniel W. Stevens, 2901 W. Belmont, Phoenix, Ariz. 85021

[21] Appl. No.: 947,229

[22] Filed: Dec. 29, 1986

Related U.S. Application Data

[63] Continuation-in-part of Ser. No. 845,012, Mar. 17, 1986, abandoned.

[51] Int. Cl.⁴ ............................................. B60P 3/10
[52] U.S. Cl. ............................. 180/414.1; 280/482; 188/112 R
[58] Field of Search ............... 280/414.1, 414.3, 482; 414/477, 478; 188/112 R

[56] References Cited

U.S. PATENT DOCUMENTS

| | | | |
|---|---|---|---|
| 2,894,766 | 7/1959 | Habriga | 280/482 |
| 3,032,353 | 5/1962 | Williams et al. | 280/414.1 |
| 3,083,986 | 4/1963 | Moody et al. | 280/414.1 |
| 3,102,737 | 9/1963 | Williams et al. | 280/482 X |
| 3,984,121 | 10/1976 | Dobosi | 280/414.1 |
| 3,989,266 | 11/1976 | Foster | 280/414.1 |
| 4,169,611 | 10/1979 | Smith et al. | 280/482 |

*Primary Examiner*—John A. Pekar
*Attorney, Agent, or Firm*—H. Gordon Shields

[57] ABSTRACT

Telescoping trailer includes a fixed frame and a movable frame secured together for relative motions, and an emergency or safety brake. Actuation elements are secured to the fixed and movable frames. Relative motion automatically disconnects safety brake elements by moving one mechanical element relative to another mechanical element when the movable frame is moved relative to the fixed frame.

31 Claims, 11 Drawing Figures

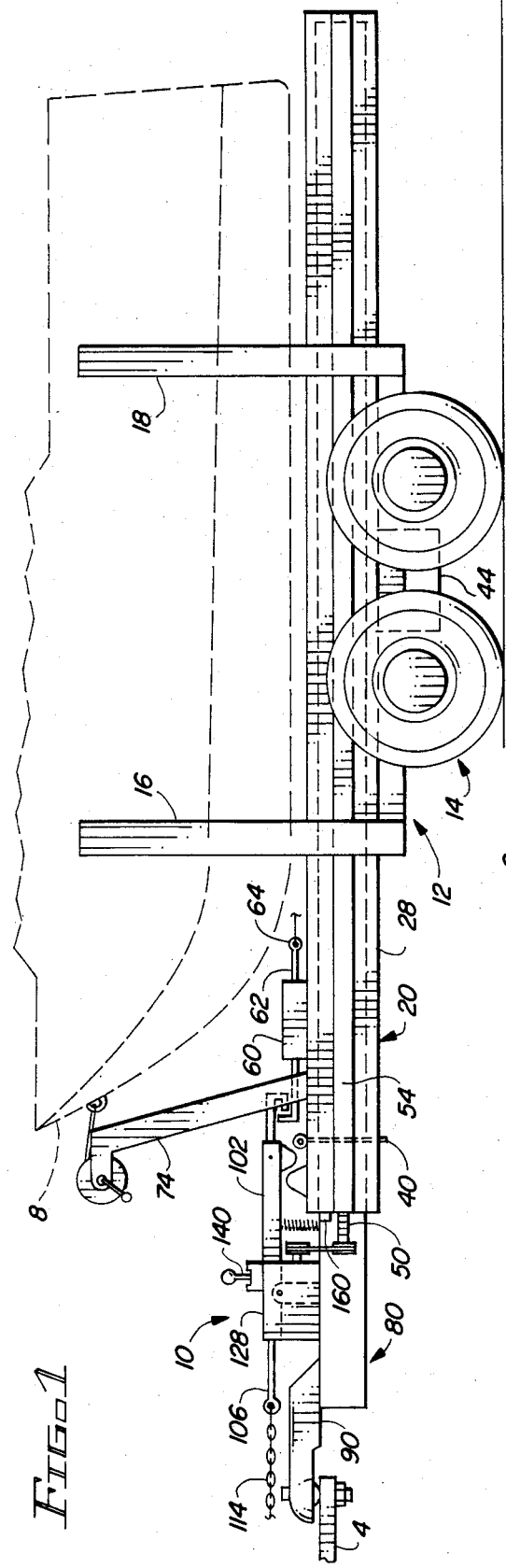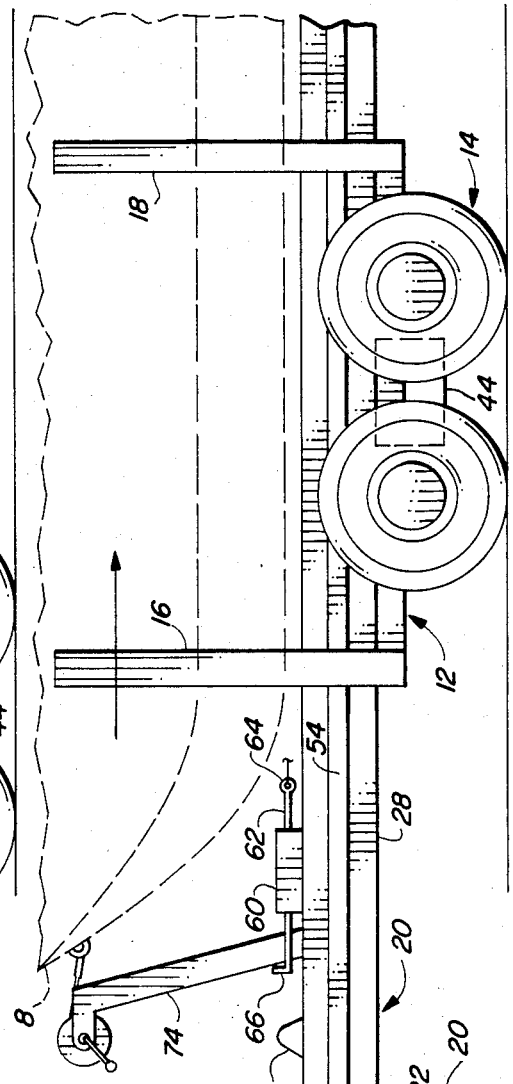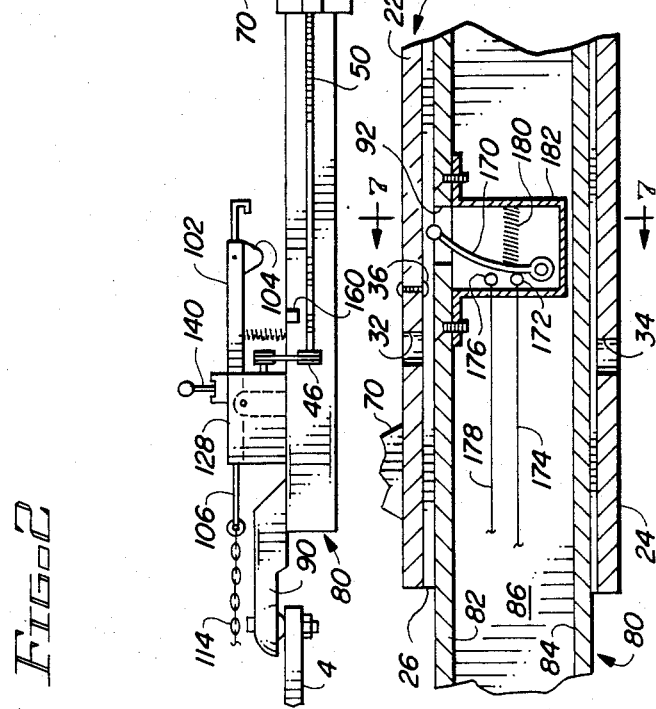

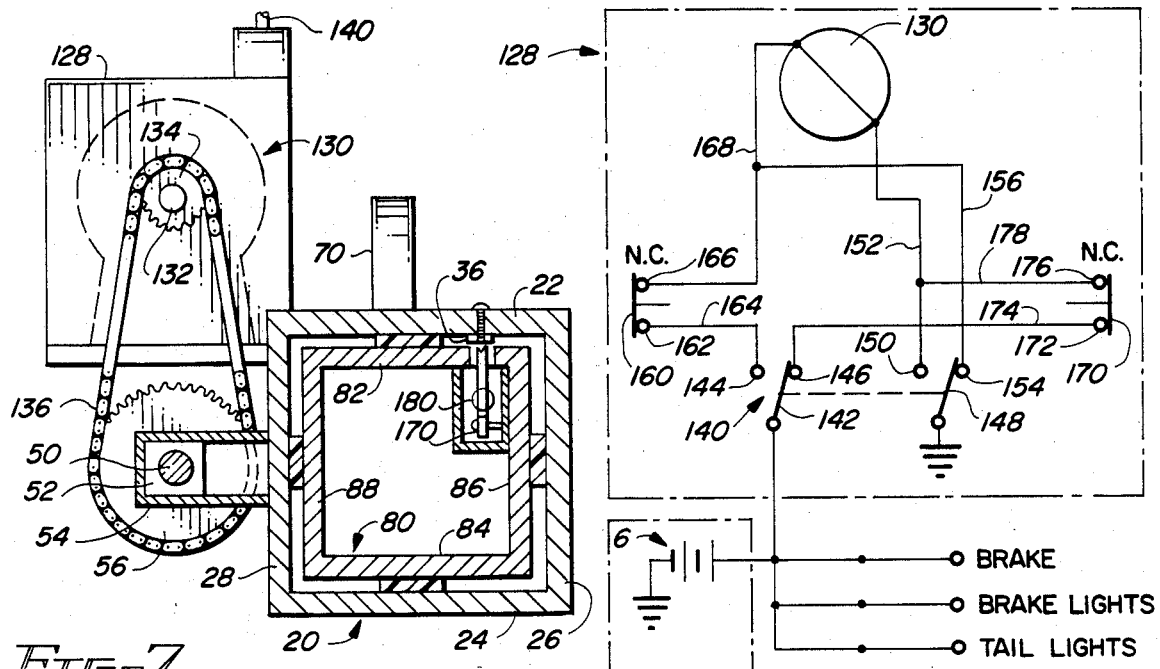
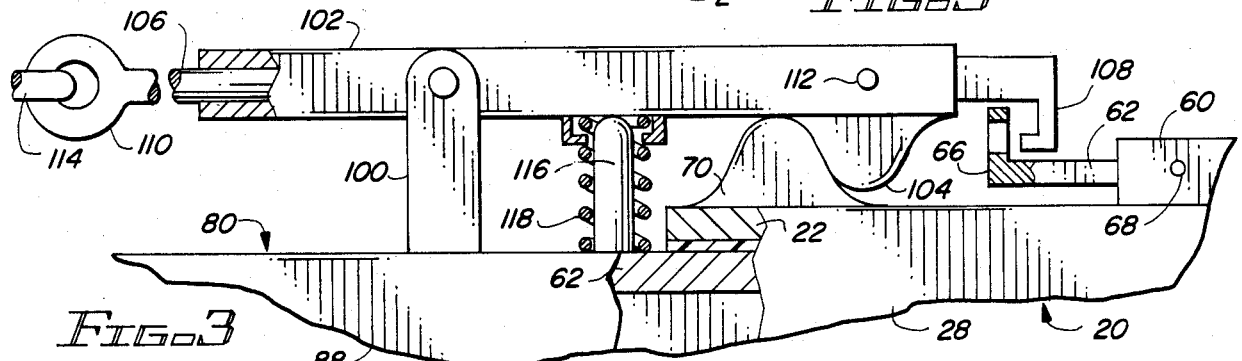
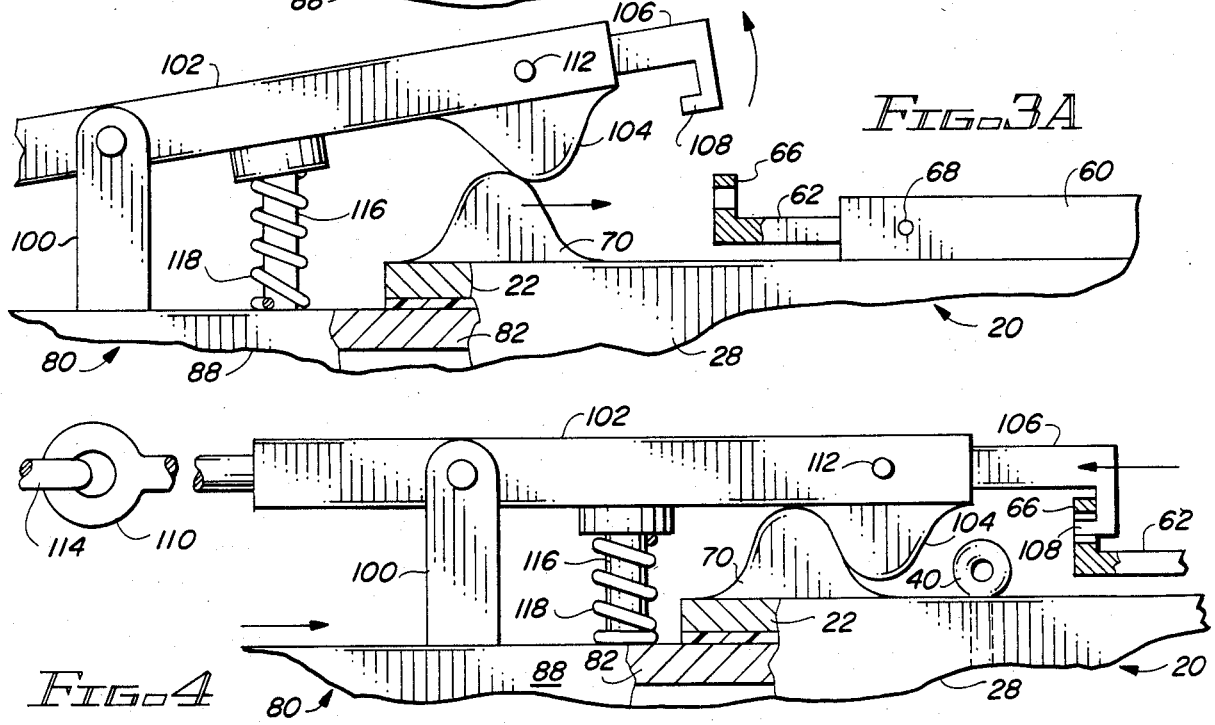

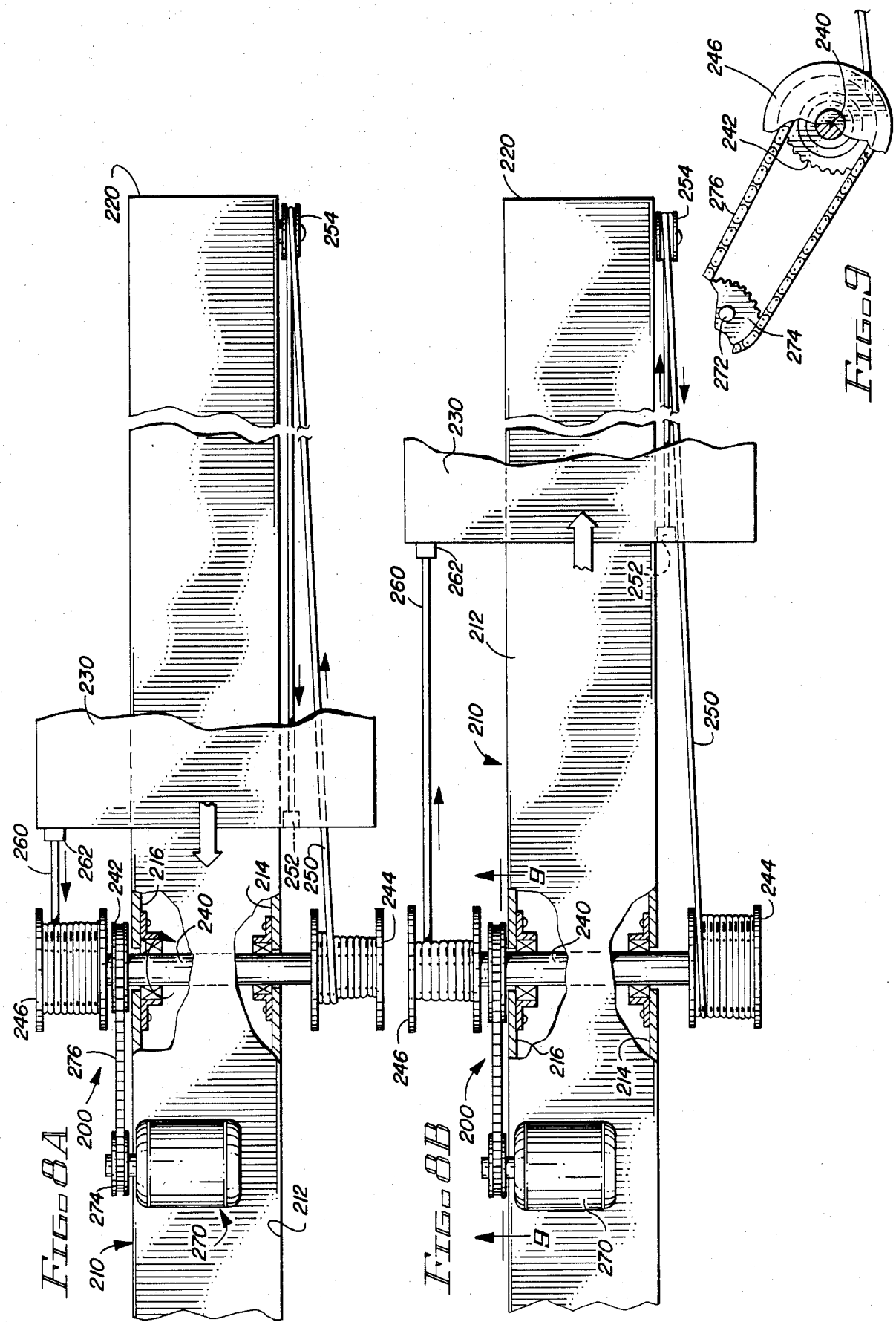

TELESCOPING BOAT TRAILER WITH SCREW DRIVE AND CAM DETACHABLE SAFETY BRAKE SEPARATOR

CROSS-REFERENCE TO RELATED APPLICATION

This is a continuation-in-part application of copending application Ser. No. 845,012, filed Mar. 17, 1986, and now abandoned.

BACKGROUND OF THE INVENTION

1. Field of the Invention

This invention relates to trailers, and, more particularly, to telescoping boat trailers.

2. Description of the Prior Art

As is well known and understood, boats are typically launched from ramps which extend into bodies of water, such as lakes, rivers, etc. In order to launch boats conveniently, it is required that the trailer on which the boat is disposed be extended far enough into the water to float the boat upon its release from the trailer. An inherent difficulty arises when a car or truck is unable to place the trailer sufficiently in the water to float the boat because of the danger of water damage to the vehicle. An obvious answer to such problem is to provide an extensible trailer with the portion supporting the boat movable relative to a fixed portion secured to the vehicle.

Typically, extensible trailers use telescoping frame members with the inner frame member secured to the vehicle and an outer portion movable relative to the inner member and thus extensible into the water and to a depth, hopefully, that will allow the boat to be conveniently released from the trailer and launched on the water.

For moving one portion of the trailer relative to the other portion of the trailer, there have been several different types of mechanical arrangements suggested. One type of arrangement is a cable arrangement using either a hand cranked winch or a motor actuated winch. However, there have been a number of trailers which utilize electrical motors and a positive engagement between the two portions on the trailer. Some type of grate system is preferred for this type of system. The prior art discloses a typical rack and pinion type drive or actuation system.

U.S. Pat. No. 2,894,766 (Habriga) discloses an extensible tongue and hitch between a tractor and a trailer. Movement of the trailer relative to the tractor is accomplished through a rack and pinion connection. The rack comprises the fixed, internal portion of the hitch apparatus, and a pinion gear is secured to the outer portion of the hitch and to the trailer, and is rotated by a hand crank to move the trailer relative to the tractor.

U.S. Pat. No. 3,032,353 (Williams et al) discloses a telescopic tow bar for a boat trailer. Relative motion between the telescoping members is accomplished by the use of compressed air or the like. The inner element acts as a piston rod, and the outer element, which moves relative to the inner element, acts as a cylinder. Compressed air introduced on opposite sides of the piston causes movement of the cylinder, and the boat trailer, relative to the piston and its associated fixed elements.

An obvious disadvantage of the apparatus of the '353 patent is in the cost of providing and maintaining a sealed relationship between the relative moving members. Also, the requirement of providing compressed air and the required hoses and valves is another obvious problem.

U.S. Pat. No. 3,083,986 (Moody et al) discloses a boat trailer with relatively movable telescoping elements. Internal roller elements are journaled on the inner, fixed element to provide bearing surfaces for the outer, movable members. A cable and winch system is used to provide relative motion between the fixed and movable portions of the apparatus. The provision of rolling elements secured to the inner, fixed element, provides inherent cost problems. Moreover, the more the trailer is extended, the less rigid it becomes.

U.S. Pat. No. 3,102,737 (Williams et al) discloses details of a pressure equalizer system usable with apparatus similar to that disclosed in the '353 patent. It will be noted that the inventors of the '353 patent and the '737 patent are the same. In addition, some of the drawings are substantially the same.

A piston and cylinder action, using compressed air, provides the actuation for the relative moving elements.

U.S. Pat. No. 3,984,121 (Dobosi) discloses a telescoping boat trailer system utilizing a rack and pinion system. The rack and pinion system is hand cranked.

U.S. Pat. No. 3,989,266 (Foster) discloses another boat trailer system in which telescoping action between relatively movable elements is provided through a chain drive. The chain drive is disposed within the interior, fixed member, while the outer, relatively movable, member includes a follower secured to the chain. A slot extends through the inner member to provide a connection between the follower and the chain. Chains require substantially constant maintenance, and the maintenance may be a problem when the chain is disposed within a member, as in this Foster patent.

An obvious disadvantage of the apparatus of the '266 patent is the cost involved in the chain drive and in the machining of the slot.

U.S. Pat. No. 4,169,611 (Smith et al) discloses another extensible trailer system in which an outer sleeve is movable relative to an inner element. Relative movement is provided through a rack and pinion drive. Two embodiments are shown, only one of which includes the rack and pinion drive. In the other embodiment, there is no mechanical drive system disclosed.

An obvious problem with all of the systems utilizing rack and pinion drive is the cost involved. The machining required for racks, particularly of the length involved in boat trailers, is relatively high, and thus the cost of the trailer is relatively high. In addition, the rack is generally disposed either within, or as, the interior element, and it is accordingly required to completely separate the relatively movable portions (the telescoping portions) in order to perform any maintenance or repair work on the rack.

SUMMARY OF THE INVENTION

The invention described and claimed herein comprises a pair of telescoping tubular members with a threaded rod secured to the fixed portion and disposed within a housing at the side of the movable portion. A nut fixed to the movable portion causes relative motion between the two portions as the threaded rod is rotated. Relative movement between the two portions causes a cam element to disengage an emergency brake connection when the relatively movable members are extended with respect to each other and causes the engagement of the elements as the relatively movable members are telescoped together.

Among the objects of the present invention are the following:

To provide new and useful telescoping trailer apparatus;

To provide new and useful relatively movable trailer portions utilizing a threaded element for providing relative motion;

To provide new and useful boat trailer apparatus in which the actuation of a motor rotates a threaded rod to cause relative motion between two portions of the trailer;

To provide new and useful trailer apparatus in which a rotating screw causes relative motion between trailer portions and between cam actuated mechanical elements to engage and disengage brake actuation elements;

To provide new and useful cam actuated elements for engaging and disengaging emergency brake elements; and To provide new and useful trailer apparatus using cables to move two portions of the apparatus.

BRIEF DESCRIPTION OF THE DRAWING

FIG. 1 is a side view of the apparatus of the present invention in its use environment.

FIG. 2 is a side view of the apparatus of the present invention showing it in its partially extended position.

FIG. 3 is an enlarged side view of a portion of the apparatus of the present invention.

FIG. 3A is an enlarged view in partial section illustrating the operation of the apparatus illustrated in FIG. 3.

FIG. 4 is a side view of the apparatus of FIGS. 3 and 3A, illustrating the actuation of elements of the apparatus.

FIG. 5 is a schematic diagram illustrating electrical circuitry of the apparatus of the present invention.

FIG. 6 is an enlarged view of a portion of the apparatus of the present invention.

FIG. 7 is an enlarged view in partial section taken generally along line 7—7 of FIG. 6.

FIG. 8A is a top view, partially broken away, of an alternate embodiment of the present invention.

FIG. 8B is a top view, partially broken away, of the apparatus of FIG. 8A, illustrating the sequential operation of the alternate embodiment.

FIG. 9 is a view taken generally along line 9—9 of FIG. 8B.

DESCRIPTION OF THE PREFERRED EMBODIMENT

FIG. 1 is a side view of extensible boat trailer apparatus 10 of the present invention secured to a trailer hitch 4 of a vehicle 2. The vehicle 2 is shown only schematically in FIG. 5, which illustrated electrical circuitry incorporated into the apparatus of the present invention. A boat 8 is shown in phantom disposed on the trailer apparatus 10.

The trailer apparatus 10 includes a frame 12 secured to dual axle wheels 14. Extending upwardly from the frame 12 are cradle support arms 16 and 18 in which is nested the boat 8.

The frame 12 is secured to an outer tube 20 which moves relative to an inner tube 80. The inner tube 80 remains fixed to the vehicle 2 and its trailer hitch 4 as the outer tube 20 moves rearwardly for launching the boat in water.

The outer tube 20 moves in rotation of a screw 50. The screw 50 is secured to the inner tube 80 and rotates thereon. The screw 50 is disposed within a housing 54 secured to the outer tube 20, and rotation of the screw 50 results in relative movement between the movable outer tube 20 and the fixed inner tube 80. The screw 50, a long threaded rod, is, of course, appropriately journaled for rotation on the tube 20. The housing 54, or portions thereof, may be removed to provide access to the screw 50 and its bearings, as required.

FIG. 2 is a side view of the trailer apparatus 10 of FIG. 1, with the trailer frame 12, as secured to the outer tube 20, moved rearwardly relative to the fixed, inner tube 80. The inner tube 80 remains secured to the trailer hitch 4 of the towing vehicle.

Included with the trailer apparatus 10 is a brake assembly 44, illustrated schematically between the dual axles in FIGS. 1 and 2. The brake assembly 44 includes an emergency brake or surge brake assembly which is automatically set in the event that the trailer apparatus 10 comes loose from the trailer hitch 4 of the towing vehicle. The surge brake assembly is mechanically actuated. In order to avoid the necessity of manually disconnecting the surge brake system when the outer tube 20 is moved relative to the inner tube 80 to launch the boat 8, the trailer apparatus 10 includes surge brake elements on both the outer tube 20 and the inner tube 80 which automatically disengages the surge brake mechanical actuation system. The elements associated with the disconnecting and reconnecting of the surge brake actuator apparatus are illustrated in FIGS. 3, 3A, and 4.

FIG. 3 is an enlarged view, in partial section, of a portion of the trailer apparatus 10 of the present invention illustrating the automatic disconnecting of the surge brake actuation apparatus. FIG. 3A is a view sequentially illustrating the automatic disconnection of the surge brake actuator system as the outer tube 20 is moved relative to the inner tube 80. FIG. 4 illustrates the mechanical actuation of the surge brake system upon the separation of the trailer apparatus 10 from its towing vehicle.

FIG. 5 is a schematic diagram illustrating the electrical system involved in the relative movement between the outer tube 20 and the inner tube 80 of the trailer apparatus 10. FIG. 6 is an enlarged view in partial section of a portion of the outer tube 20 and the inner tube 80, illustrating the actuation of a portion of the electrical system. FIG. 7 is a view in partial section taken generally along line 7—7 of FIG. 6, showing the outer tube 20, the inner tube 80, and the screw 50, and the various elements involved in the rotation of the screw 50, and part of the electrical system shown in FIGS. 5 and 6.

For the following discussion of the trailer apparatus 10 of the present invention, reference will be made to all of the Figures in the drawing. Periodically, specific Figures will be refered to.

As best shown in FIG. 7, the outer tube 20 includes a top plate 22, a bottom plate 24, and a pair of side plates 26 and 28. The outer tube 20 is preferably square. The top and bottom plates are accordingly parallel to each other, and the side plates are similarly parallel to each other. Appropriate bearing elements are disposed between the outer tube 20 and the inner tube 80. Four of the bearing elements are shown in FIG. 7.

When the trailer apparatus 10 is secured together, with the outer tube 20 nested with, or telescoped on, the inner tube 80, as shown in FIG. 1, the two tubes 20 and 80 are appropriately secured together by a pin 40. The pin 40 extends through the plates of the inner and outer tubes in pin apertures. A pair of pin apertures 32 and 34 are shown in FIG. 6 extending through the top plate 22 and the bottom plate 24, respectively, of the outer tube 20. When the tubes 20 and 80 are fully nested, as shown in FIG. 1, the pin apertures 32 and 34 are aligned with a similar pair of pin apertures (not shown) in the inner tube 80.

As best shown in FIG. 7, the screw 50 is disposed within the housing 54 on the outer tube 20, and the housing 54 is in turn appropriately secured to the side plate 28 of the outer tube 20. A nut 52 is shown in FIG. 7 disposed about the screw 50 and secured within the housing 54. The nut 52 is appropriately fixed or secured in place on the side plate 28 of the tube 20, and accordingly the nut 52 does not rotate as the screw 50 rotates. Obviously, a plurality of fixed nuts, similar to the nut 52, may be secured to the side plate 28 and within the housing 54 along the length of the screw 50. Appropriate bearing elements may also be disposed along the length of the screw to help support the screw. Such elements are, of course, well known and understood in the art.

Disposed on the top plate 22 of the outer tube 20 is a surge brake rear actuator sleeve 60. The sleeve 60 is appropriately secured to the plate 22. Disposed within the sleeve 60 is a surge brake rear actuator rod or lever 62. The actuator lever or rod 62 includes a rear horizontal eye 64 and a front vertical eye 66. These features are best shown in FIGS. 3, 3A, and 4. The actuator rod 62 is secured to the sleeve 60 by a pin 68. The pin 68 is a soft rolled pin which breaks under a predetermined, relatively light, pressure or force, to allow relative motion between the sleeve 60 and the rod 62 to actuate the surge brake system.

A cam 70 is also secured to the top plate 22 forwardly of, or in front of, the front, vertically extending eye 66 of the rod 62. The cam 70 is spaced apart from the eye 66.

Also extending upwardly from the top plate 22 of the outer tube 20 is a winch assembly 74. The winch assembly 74 is appropriately secured to the boat 8 through a cable connection for aiding in the launching and the retrieval of the boat 8 from and to the trailer apparatus 10. Such winch assemblies are, of course, well known and understood in the art.

The fixed, inner tube 80, as best shown in FIG. 7, includes four plates, including a top plate 82, a bottom plate 84, a side plate 86, and a side plate 88. The tube 80 is square, like the outer tube 20, and accordingly the top and bottom plates are parallel to each other, and the side plates are also parallel to each other. A trailer hitch 90 is secured to the top plate 82, and extends forwardly from the top plate 82 for appropriate securing to the trailer hitch 4 of the towing vehicle.

Secured also to the top plate 82 is a surge brake pivot yoke 100. A surge brake front actuator sleeve 102 is appropriately secured to the pivot yoke 100 for vertical pivoting movement.

Extending downwardly from the rear of the sleeve 102 is a cam element 104. The cam element 104 is substantially identical to the cam element 70 of the outer tube 20. When the two tubes 20 and 80 are in their closed position, as shown in FIGS. 1 and 3, the two cams 70 and 104 are disposed adjacent to each other, with the rear face of the cam 70 adjacent to the front face of the cam 104.

A front brake actuator lever or rod 106 is disposed within the sleeve 102, and is movable within the sleeve under emergency conditions, as will be discussed below. The actuator rod 106 includes a rear hook 108, and a front eye 110, at its respective rear and front ends. The hook 108 cooperates with the front eye 66 of the rear actuator lever or rod 62. The front eye 110 is in turn secured to a chain 114, or the like, which extends to, and is appropriately secured to, the towing vehicle 2 for the trailer 10.

A pin 112 extends through the sleeve 102 and through the rod 106 to hold the rod 106 in position within the sleeve 102 during normal operation. The pin 112, like the pin 68 of the sleeve 60 and its rod 62, is not a hard pin, but rather is simply a lock pin to hold the rod 106 within the sleeve 102. Upon an accidental disengagement between the hitch 4 of the towing apparatus and the hitch 90 of the trailer pin, a pull by the chain 114 against the eye 110 causes relative movement between the rod 106 and the sleeve 102 to break the pin 112.

A stop element 116 is appropriately secured to the top of the plate 82 of the inner tube 80. It extends upwardly from the tube 80 and terminates beneath the sleeve 102. A tension spring 118 is disposed about the stop element 116 and is appropriately secured to both the plate 82 of the inner tube 80 and the sleeve 102 to provide a downward bias urging the sleeve 102 downwardly so that the sleeve 102 is substantially horizontal, as shown in FIGS. 1, 2, 3, and 4.

When the pin 40 (see FIGS. 1 and 4) is removed from the outer tube 20 and the inner tube 80, the outer tube 20 is able to move relative to the inner tube 80. The rearward movement of the tube 20 causes the sleeve 102 to pivot upwardly due to the cooperative action of the cams 70 and 104. As the sleeve 102 moves upwardly, the hook 108 of the rod 106 is moved upwardly, and away from the vertical eye 66 of the rod 62. This is shown in FIG. 3A. The continued movement of the tube 20 causes the cams 70 and 104 to clear each other, and the sleeve 102 then moves downwardly under the bias of the tension spring 116. The surge brake of the trailer apparatus 10 is not actuated under these conditions. The mechanical disengagement of the surge brake actuation system is accomplished automatically by the action of the cams 70 and 104 as the outer tube 20 moves rearwardly relative to the inner tube 80.

After the boat 8 is launched, or after the boat 8 is returned to the trailer apparatus 10, and the outer tube 20 is to be closed or retracted with respect to the fixed, inner tube 80, the outer tube 20 moves forwardly by the action of the screw 50. As the front face of the cam 70 contracts the rear face of the cam 104, the sleeve 102 again pivots upwardly in the reverse action from that illustrated in FIG. 3A. The upward pivoting of the sleeve 102 allows the hook 108 to clear the eye 66. Again, as the cams pass each other, the bias of the tension spring 118 returns the sleeve 102 downwardly to the position shown in FIGS. 1, 2, 3, and 4. When the tubes 20 and 80 are in their closed position, the eye 66 is once more positioned adjacent to the hook 104, as shown in FIGS. 1 and 3.

The actuation of the surge brake system is best illustrated in FIG. 4. For actuating the emergency surge brake system, the chain 114, secured to the towing vehicle, exerts a pull on the rod 106. This pull or force breaks the pin 112 to allow the rod 106 to move relative to the sleeve 102. The forward movement (to the left as shown in the drawing) of the rod 106 causes a positive engagement of the hook 108 into the eye 66. The continued movement of the rod 106 causes a corresponding forward movement of the rear actuator rod 62. The forward movement of the rod 62 in turn results in a breaking of the pin 68 to allow the rod 62 to move relative to its sleeve 60. And, the forward movement of the rod 62 also results in the actuation of the surge brake system of the brake assembly 44, which is appropriately connected to the eye 64.

FIG. 5 is a schematic electrical diagram associated with the movement of the outer tube 20, which is in turn accomplished through the rotation of the screw 50. For a discussion of the electrical system, and the rotation of the screw 50, reference will primarily be made to FIGS. 1, 2, 5, 6, and 7.

The towing vehicle 2 includes a battery 6. The battery 6 provides the necessary electrical power for the actuation of the tail and brake lights for the towing vehicle 2 and the trailer apparatus 10, and also for the actuation of electric brakes for the trailer apparatus 2.

The battery 6 also provides power for operating a reversible motor 130 which is disposed within a housing 128 secured to the fixed inner tube 80. The housing 128 is shown schematically in FIG. 5. The motor 130 includes an output shaft 132 which is secured to a sprocket 134. A drive chain 136 extends over the sprocket 134 and over the sprocket 56, which is secured to the screw 50.

Extending upwardly from the motor housing 128 is an actuator lever 140. Movement of the actuator lever 140 in either a forward or a rearward direction causes actuation of the motor 130 in either of its two directions to move the outer tube 20 relative to the inner tube 80 by rotation of the screw 50. The lever 140 has a neutral, or center "off" position, which is shown in FIGS. 1 and 2. The actuator lever 140 is, in reality, a double pole, double throw switch lever, which includes a pair of poles 142 and 148, as shown in FIG. 5. The pole 142 is disposed between a pair of contacts 144 and 146, and the pole 148 is disposed between a pair of contacts 150 and 154. Movement of the lever 140 results in joint movement of both poles 142 and 148.

A pair of normally closed limit switches 160 and 170 are used to limit the movement of the outer tube 20 relative to the inner tube 80 by stopping the motor 130. The limit switch 160 is the "in" limit switch, and the limit switch 170 is the "out" limit switch. As shown in FIG. 5, the actuator lever 40 is in the "out" position, causing the motor 130 to rotate the screw 50 to move the outer tube 20 outwardly, or rearwardly, with respect to the inner tube 80. This is illustrated in FIGS. 2 and 6. While the limit switches 160 and 170 are shown in FIG. 5 as being within the housing 128, it will be understood that this is for convenience only. In FIGS. 1 and 2, the limit switch 160 is shown secured to the inner tube 80 at the "in" limit of the outer tube 20. The "out" limit switch 170 is shown in FIGS. 6 and 7 secured within the inner tube 80. It is disposed at the rear end of the tube 80 so as to limit the outward movement of the outer tube 20 relative to the inner tube 80. This will be discussed in more detail below.

With the actuator lever in the "out" position, the pole 142 is electrically connected to the contact 146. The contact 146 is in turn connected to a contact 172 of the out limit switch 170 by a conductor 174. The battery 6 is electrically connected to the pole 142 to provide power to the motor 130 through the contact 146, the conductor 174, the contact 172 of the switch 170, and also a contact 176 of the switch 170, and a conductor 178 which extends from the contact 176 to the motor 130.

The return or ground path for the motor 130 is through a conductor 156 to the contact 154 and the pole 148 of the actuator lever or switch 140.

As shown in FIGS. 6 and 7, the limit switch 170 extends upwardly through an aperture 92 (see FIG. 6) in the top plate 82 of the fixed, inner tube 80. The switch 170 is biased against its contacts 172 and 176 by a compression spring 180. The switch 170 and the spring 180 are disposed within a housing 182 within the inner tube 80.

Extending downwardly through the top plate 22 of the outer tube 20 is a switch actuator 36. The switch actuator 36 is aligned with the switch 170 so that as the tube 20 moves rearwardly, the switch actuator 36 will contact the switch 170 to break the electrical connection between the contacts 172 and 176 by moving the switch 170 against the bias of the compression spring 180. With electrical connection between the contacts 172 and 176 broken, the motor 130 will stop.

When the switch actuator 140 is moved from the position shown in FIG. 5 so that the poles 142 and 148 are in electrical connection with the contacts 144 and 150, respectively, the motor 130 is reversed, which causes the screw 50 to rotate to move the outer tube 20 inwardly, or to the left, as viewed in the drawings, to cause the tube 20 to retract or to move forward. Electrical connection between the battery 6 and the motor 130 is then accomplished through the pole 142, the contact 144, and in the limit switch 160 by means of a switch contact 162. A conductor 164 extends from the contact 144 to the contact 162. The "in" limit switch 160 also includes a contact 166. A conductor 168 extends from the contact 166 to the motor 130. The return path for the current to the motor 130 and the switch 160 is from the motor 130 by a conductor 152 which extends from the motor 130 to the switch contact 150. The pole 148 is in turn connected to the contact 150.

The limit switch 160 is shown only as a block in FIGS. 1 and 2, connected to the fixed, inner tube 80. It is, of course, a well known and understood switch element. It may remain fixed in place, and is actuated simply by the movement of the tube 20 against the switch directly, and accordingly needs no particular actuator element, like the switch actuator 36 for the out limit switch 170. Rather, merely the action or the movement of the outer tube 20, itself, against the switch 160 is sufficient to break the electrical connection between the switch 160 and its terminals 162 and 166. Such is, of course, well known and understood in the art.

The switch 160 is also, of course, spring biased to the normally closed position. Accordingly, when the tube 20 moves away from the switch 160, electrical connection between the switch 160 and its contacts 162 and 166 will be made to allow the motor 130 to reverse, as desired, and to move in accordance with the position of the switch actuator lever 140. The same is also true with the out limit switch 170, in that the switch 170 is biased by its spring 180 against the contacts 172 and 176 any time the limit switch actuator 36 is away from contact with the switch 170. Thus, the motor 130 is free to be actuated in either direction except when a limit switch 160 or 170 is actuated to stop movement. When the tube 80 is at its outer or inner limit, the movement may only be reversed.

Well known and understood details of the electrical system, such as a fuse and a key switch, have been omitted from the specification for purposes of clarity.

FIG. 8A is a view of an alternate embodiment 200 of a portion of the apparatus of the present invention. The embodiment 200 includes an inner tube 210 and an outer tube 230 movable on the inner tube 210. A shaft or axle 240 extends through the inner tube and is appropriately journaled for rotation thereon. A pair of cable drums 244 and 246 are secured to the shaft 240. A pair of cables 250 and 260 are connected to the outer tube 230 and to the drums 244 and 246, respectively. A motor 270 is connected to the shaft 240 to rotate the shaft 240 and the drums 244 and 246.

FIG. 8B is a view of the apparatus of FIG. 8A, illustrating sequentially the operation of the apparatus 200.

FIG. 9 is a fragmentary view taken generally along line 9—9 of FIG. 8B illustrating the linkage between the motor 270 and the shaft 240 for rotating the drums 244 and 246 through the shaft 240.

For the following discussion, reference will primarily be made to FIGS. 8A, 8B, and 9. It will be noted, at the outset, that FIGS. 8A, 8B, and 9 omit elements disclosed in FIGS. 1-7, and which will be included with the alternate embodiment 200. Primarily, the elements associated with the brake system and the electrical system, with the various controls and switches, are not illustrated in FIGS. 8A, 8B, or 9 in order to simplify the explanation of the alternate embodiment 200. The alternate embodiment 200 is concerned with the cable system for moving the outer tube 230 relative to the inner tube 210. Accordingly, the brake elements, bearing elements, and electrical elements have been omitted for purposes of clarity. Obviously, the brake system, the electrical system, and bearings would be involved. It will accordingly be understood that, in discussing the motor 270, an electrical system will be employed in the control of the motor 270, which is a reversible motor. The electrical power and controls for a motor, etc., have been discussed above in detail in conjunction primarily with FIGS. 1, 2, 5, 6, and 7.

The inner tube 210 includes a top plate 212, a side plate 214, and a side plate 216. The inner tube 210 also includes an outer end 220. The side plates 214 and 216 are generally parallel to each other.

The outer tube 230 is shown disposed on the inner tube 210. The outer tube is also made up of plates, which are generally parallel to the plates of the inner tube. The outer tube is, of course, larger than the inner tube, and is appropriately journaled for movement thereon, as discussed above in conjunction with FIGS. 4, 6 and 7. In FIGS. 8A and 8B, the size of the outer tube 230 has been enlarged with respect to the inner tube 210 for purposes of clarity. The bearing structure or structures between the inner tube 210 and the outer tube 230 have also been omitted from FIGS. 8A and 8B.

An axle or shaft 240 is shown extending through appropriate apertures in the side plates 214 and 216 and through the inner tube 210. The axle or shaft 240 is appropriately journaled for rotation on the side plates 214 and 216. An out-spool or drum 244 is secured to the axle or shaft adjacent to the side plate 214 of the inner tube 210. An in-spool or drum 246 is secured to the opposite end of the axle or shaft 240, adjacent to the side plate 216 of the inner tube 210. The terms "in-spool" and "out-spool" refer to the purpose of the spools or drums 244 and 246 with respect to the movement of the outer tube 230 relative to the inner tube 210.

An out cable 250 is secured at one end to the out-spool 244 and is wound about the spool or drum. The opposite end of the out cable 250 extends to a termination 252 secured to the outer tube 230. The out cable 250 extends over a pulley or sheave 254 secured to the side plate 214 of the inner tube 210 adjacent to the outer end 220 of the tube 210. As shown in both FIGS. 8A and 8B, the out cable 250 winds off and on the drum or spool 244 from the top of the drum or spool 244.

An in cable 260 is wound about the drum or spool 246 and is secured to a termination 262 on the outer tube 230. The opposite end of the cable 260 is appropriately secured to the drum 246. It will be noted, as shown in FIGS. 8A and 8B, that the cable 260 winds on and off the drum 246 from the bottom of the drum 246.

The cable 260 is connected directly to the outer tube 230, and does not need a pulley or sheave, such as the pulley or sheave 254, to reverse its direction, since it pulls in one direction only, directly onto and off of the spool 246, in pulling the outer tube 230 inwardly with respect to the inner tube 210. The cable 250, which is used to move the outer tube 230 outwardly, as indicated by the enlarged arrow in FIG. 8B, requires a change of direction, and hence the need for the pulley or sheave 254.

As indicated above, the motor 270 is a reversible motor used to move the outer tube 230 both outwardly and inwardly with respect to the inner tube 210. The motor 270 accordingly is substantially identical to the motor 130 discussed above in conjunction with the embodiment of the apparatus 10.

The motor 270 includes a shaft 272 to which is secured a sprocket 274. A sprocket 242 is appropriately secured to the shaft 240. A drive chain 276 extends about both sprockets 274 and 242 for rotating the shaft 240 and accordingly, or thereby, for rotating the drums 244 and 246.

When the motor 270 is driven in the direction to cause a counterclockwise rotation of the shaft 240, with respect to the direction of travel of FIG. 9, and also FIGS. 8A and 8B, the drum 244 is rotated counterclockwise to wind the cable 250 onto the drum 244. As the cable 250 is wound on the drum 244, the outer tube 230 is moved outwardly as a result of a shortening of the cable 250. The cable 250 is shortened by the cable 250 pulling against its termination 252 on the outer tube 230. The tube 230 accordingly moves outwardly with respect to the inner tube 210 to move a trailer connected to the outer tube 230, such as the trailer 12 discussed above primarily in conjunction with FIGS. 1 and 2, and any boat, etc., disposed thereon.

As the cable 250 is wound onto the drum 244, the drum 246, which rotates in the same direction, winds its cable 260 off the drum 246. The cable 260 is pulled off the drum by the outward, or direction toward the right as viewed in FIGS. 8A and 8B, movement of the outer tube 230.

When the motor 270 is reversed so that the shaft 240 moves in a clockwise direction, as viewed in FIG. 9 and in FIGS. 8A and 8B, the cable 260 is wound onto the drum 246 to cause the outer tube 230 to move inwardly with respect to the inner tube 210. At the same time, the cable 250 is wound off of the drum 244. Since the cables 250 and 260 feed onto and off of their respective drums 244 and 246 from opposite portions of the drum, the cables will move in opposite directions with respect to each other regardless of the direction of rotation of the shaft and of the drums. Thus, as one cable is wound onto its drum, the other cable is wound off of its drum.

The functioning of the cable system of the embodiment of FIGS. 8A, 8B, and 9 is, for all practical purposes, substantially identical to the threaded shaft drive of the embodiment of FIGS. 1-7, as far as movement of an outer tube and of a trailer secured thereto is concerned. However, it will be noted that the cable drive may be substantially less expensive to manufacture and sell than the threaded shaft drive system. However, each drive system has its advantages and disadvantages.

To compensate for the uneven or unequal winding on and off of the cables on their drums, appropriate spring tension systems, etc., may be required. Such have not been illustrated herein, since they are relatively well known and understood in the art.

It will be noted that instead of tubes, as discussed for both embodiments, inner and outer frames may also be used. Moreover, the cross-sectional configuration of the tubes or frames need not be square, as shown. Other appropriate cross-sectional configurations may also be employed.

In both trailer embodiments discussed herein, there is a boat frame secured to a movable frame member and the movable frame member is secured to a fixed frame member. The fixed frame member is in turn secured, or is securable, to a towing vehicle. The fixed frame member and the movable frame member are movable relative to each other. The movable frame member moves relative to the fixed frame member.

The two frame members are fixedly secured together during towing operations. Preferably, a pin connection is used to secure the frame members together for towing. A pin 40 is shown in FIG. 1 for the apparatus 10 embodiment. No pin is shown for the apparatus 10, just as no emergency brake system, electrical circuitry, etc., is shown in FIGS. 8A, 8B, and 9.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Telescoping trailer apparatus having an emergency brake system, comprising, in combination:
    frame means, including
        fixed frame means, including means for securing the trailer apparatus to a towing vehicle, and
        movable frame means movably secured to the fixed frame means;
    means for moving the movable frame means relative to the fixed frame means;
    limit means for limiting the relative movement of the fixed and movable frame means;
    emergency brake means engageable to actuate the emergency brake system, including
        first sleeve means secured to the fixed frame means,
        first rod means disposed in the first sleeve means and movable therein and securable to the towing vehicle,
        second sleeve means secured to the movable frame means, and
        second rod means disposed in the second sleeve means and adjacent to the first rod means and secured to the emergency brake system and engageable with the first rod means and movable in the second sleeve means to actuate the emergency brake system in response to movement of the first rod means; and
    means for pivoting the first sleeve means and the first rod means relative to the second sleeve means and the second rod means to prevent engagement between the first rod means and the second rod means as the movable tube means moves relative to the fixed tube means.

2. The apparatus of claim 1 in which the means for moving the movable frame means includes a reversible electric motor.

3. The apparatus of claim 2 in which the means for moving the movable frame means further includes control means for controlling the reversible electric motor.

4. The apparatus of claim 3 in which the limit means includes
    first limit means for limiting the movement of the movable frame means relative to the fixed frame means in a first direction, and
    second limit means for limiting the movement of the movable frame means relative to the fixed frame means in a second direction.

5. The apparatus of claim 3 in which the first limit means includes a first limit switch for disconnecting the electrtic motor when the movable frame means reaches a first predetermined location relative to the fixed frame means.

6. The apparatus of claim 4 in which the second limit means includes a second limit switch for disconnecting the electric motor when the movable frame means reaches a second predetermined location relative to the fixed frame means.

7. The apparatus of claim 1 in which the fixed frame means includes a fixed tube, and the movable frame means includes a movable tube telescopingly movable relative to the fixed tube means.

8. The apparatus of claim 7 in which the means for moving the movable frame means relative to the fixed frame means includes screw means secured to the fixed frame means and to the movable frame means and rotatable to move the movable frame means relative to the fixed frame means.

9. The apparatus of claim 7 in which the means for moving the movable frame means relative to the fixed frame means includes winch means secured to the fixed frame means and to the movable frame means and actuable for moving the movable frame means relative to the fixed frame means.

10. The apparatus of claim 9 in which the winch means includes
    first drum means rotatably secured to the frame means,
    first cable means secured to the first drum means and to the frame means and winding onto and off of the first drum in response to rotation of the first drum means to move the movable frame means in a first direction, second drum means rotatably secured to the frame means, second cable means secured to the second drum means and to the frame means and winding onto and off of the second drum means in response to rotation of the second drum means to move the movable frame means in a second direction.

11. The apparatus of claim 10 in which the first drum means and the second drum means are connected together for joint rotation, and the first cable means winds onto the first drum means as the second cable means winds off of the second drum means, and the second cable means winds onto the second drum means as the first cable means winds off of the first drum means.

12. Telescoping trailer apparatus, including an emergency brake system, comprising, in combination:

fixed tube means, including means for securing the trailer apparatus to a towing vehicle;

movable tube means telescopingly movable relative to the fixed tube means;

screw means secured to the fixed tube means and to the movable tube means and rotatable to move the movable tube means relative to the fixed tube means;

means for rotating the screw means to move the movable tube means;

limit means, including
first limit means for limiting the movement of the movable tube means relative to the fixed tube means in a first direction, and
second limit means for limiting the movement of the movable tube means relative to the fixed tube means in a second direction;

emergency brake means engageable to actuate the emergency brake system, including
first sleeve means secured to the fixed tube means,
first rod means disposed in the first sleeve means and movable therein and securable to the towing vehicle,
second sleeve means secured to the movable tube means,
second rod means disposed in the second sleeve means and adjacent to the first rod means and secured to the emergency brake system and engageable with the first rod means and movable in the second sleeve means to actuate the emergency brake system in response to movement of the first rod means; and means for pivoting the first sleeve means and the first rod relative to the second sleeve means and the second rod means to prevent engagement between the first rod means and the second rod means as the movable tube means moves relative to the fixed tube means.

13. The apparatus of claim 12 in which the means for rotating the screw means includes a reversible electrical motor.

14. The apparatus of claim 13 in which the means for rotating the screw means further includes control means for controlling the reversible electric motor.

15. The apparatus of claim 14 in which the first limit means includes a first limit switch for disconnecting the electric motor when the movable tube means reaches a first predetermined location relative to the fixed tube means.

16. The apparatus of claim 15 in which the second limit means includes a second limit switch for disconnecting the electric motor when the movable tube means reaches a second predetermined location relative to the fixed tube means.

17. The apparatus of claim 16 in which the first and second limit switches include normally closed electrical contacts which open when the movable tube means reaches the respective first and second predetermined locations.

18. The apparatus of claim 12 in which the first sleeve means includes a first sleeve, and the first sleeve pivots in response to movement of the movable tube means.

19. The apparatus of claim 18 in which the means for pivoting the first sleeve and the first rod includes first cam means secured to the first sleeve means and second cam means secured to the movable tube means, and the first sleeve means pivots in response to contact between the first and second cam means as the movable tube means moves relative to the fixed tube means.

20. The apparatus of claim 19 in which the first sleeve means includes stop means for limiting the pivoting of the first sleeve means in a first direction.

21. The apparatus of claim 20 in which the first sleeve means further includes means for biasing the first sleeve against the stop means.

22. Telescoping trailer apparatus including an emergency brake system comprising, in combination:

first tube means securable to a towing vehicle;
second tube means movable rearwardly and forwardly relative to the first tube means;
winch and cable means secured to the first and second tube means and rotatable to move the second tube means rearwardly and forwardly relative to the first tube means;
means for rotating the winch and cable means to move the second tube means relative to the first tube means; and emergency brake actuation system means, including
first actuation means secured to the first tube means and connectable to the towing vehicle for actuating the emergency brake system,
second actuation means secured to the second tube means and connectable to the first actuation means for actuating the emergency brake system, and
means for preventing the connection of the first and second actuation means as the second tube means moves rearwardly relative to the first tube means.

23. The apparatus of claim 22 in which the first actuation means of the emergency brake actuation system means includes a first sleeve secured to the first tube means and a first rod movably disposed in the first sleeve and connectable to the towing vehicle.

24. The apparatus of claim 23 in which the second actuation means of the emergency brake actuation system means includes a second sleeve secured to the second tube means and a second rod movably disposed in the second tube means and connected to the emergency brake system and connectable to the first rod for actuation of the emergency brake system in response to movement of the first rod when the first and second rods are connected together.

25. The apparatus of claim 24 in which the means for preventing the connection of the first and second rods includes cam means for pivoting the first sleeve and the first rod away from the second rod as the second tube means moves outwardly relative to the first tube means.

26. The apparatus of claim 25 in which the cam means includes first cam means secured to the first sleeve means and second cam means secured to the second tube means.

27. The apparatus of claim 25 in which the first actuation means further includes means for pivotably securing the first sleeve and the first rod to the first tube means.

28. The apparatus of claim 27 in which the first actuation means further includes means for biasing the first sleeve and the first rod against pivoting of the first sleeve and the first rod by the cam means.

29. The apparatus of claim 24 in which the first actuation means further includes first means for releasably securing the first rod in the first sleeve for preventing inadvertent movement of the first rod in the first sleeve.

30. The apparatus of claim 29 in which the second actuation means further includes second means for releasably securing the second rod in the second sleeve for preventing inadvertent movement of the second rod in the second sleeve.

31. The apparatus of claim 24 in which the first actuation means and the second actuation means further includes an eye and a hook extendable into the eye to connect the first and second rods together upon movement of the first rod in the first sleeve to actuate the emergency brake system.

* * * * *